(12) United States Patent
Nicholls

(10) Patent No.: US 11,048,666 B2
(45) Date of Patent: *Jun. 29, 2021

(54) METHOD AND APPARATUS FOR SHALLOW COPY FUNCTIONALITY

(71) Applicant: Charles Nicholls, Los Angeles, CA (US)

(72) Inventor: Charles Nicholls, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,233

(22) Filed: Nov. 21, 2019

(65) Prior Publication Data
US 2020/0089657 A1    Mar. 19, 2020

Related U.S. Application Data

(63) Continuation of application No. 15/202,571, filed on Jul. 6, 2016, now Pat. No. 10,521,402.

(51) Int. Cl.
*G06F 16/178*    (2019.01)

(52) U.S. Cl.
CPC .................. *G06F 16/178* (2019.01)

(58) Field of Classification Search
CPC ................................... G06F 16/178
USPC ...................................... 707/626
See application file for complete search history.

(56) References Cited

U.S. PATENT DOCUMENTS

| | | | | |
|---|---|---|---|---|
| 9,063,946 B1* | 6/2015 | Barber | .................. | G06F 16/125 |
| 9,189,263 B1* | 11/2015 | Monnie | ............... | G06F 9/45533 |
| 9,207,930 B2* | 12/2015 | Srivas | .................. | G06F 16/182 |
| 9,323,775 B2* | 4/2016 | Srivas | .................. | G06F 16/275 |
| 9,646,024 B2* | 5/2017 | Srivas | .................. | G06F 16/275 |
| 9,773,016 B2* | 9/2017 | Srivas | .................. | G06F 16/178 |
| 2005/0028006 A1* | 2/2005 | Leser | .................. | G06F 21/6209 726/26 |
| 2005/0080807 A1* | 4/2005 | Beilinson | .............. | G06F 16/904 |
| 2006/0069702 A1* | 3/2006 | Moeller | .................. | G06F 9/542 |
| 2009/0254601 A1* | 10/2009 | Moeller | .................. | G06F 9/542 709/201 |
| 2011/0313973 A1* | 12/2011 | Srivas | .................. | G06F 16/235 707/634 |
| 2012/0101991 A1* | 4/2012 | Srivas | ................. | G06F 16/1844 707/623 |
| 2012/0124046 A1* | 5/2012 | Provenzano | ........ | G06F 11/1453 707/737 |
| 2012/0124105 A1* | 5/2012 | Provenzano | ........ | G06F 11/1453 707/813 |
| 2015/0106345 A1* | 4/2015 | Trimble | .............. | G06F 16/1748 707/692 |
| 2016/0026704 A1* | 1/2016 | Strong | .................... | H04L 67/42 707/624 |
| 2016/0028813 A1* | 1/2016 | Strong | ................ | G06F 16/2365 709/217 |

(Continued)

*Primary Examiner* — Sheree N Brown
(74) *Attorney, Agent, or Firm* — Bryan Fibel

(57) ABSTRACT

Method and apparatus for shallow copy functionality are provided. The invention discloses embodiments capable of creating, managing and editing a user's data and a graphical, and related command line, user interface for visualizing and interacting with both the containers for collections of data items and the contained data items. The invention provides for copying a data object to a new container such that the original and new data object are indistinguishable in appearance and content.

12 Claims, 7 Drawing Sheets

(56) References Cited

U.S. PATENT DOCUMENTS

| | | | |
|---|---|---|---|
| 2016/0078052 A1* | 3/2016 | Srivas | G06F 16/1844 707/611 |
| 2016/0239514 A1* | 8/2016 | Srivas | G06F 16/235 |

\* cited by examiner

METHOD AND APPARATUS FOR SHALLOW COPY FUNCTIONALITY

CROSS REFERENCE TO RELATED APPLICATIONS

This application is a Continuation that claims priority from a non-provisional U.S. patent application Ser. No. 15/202,571 filed on Jul. 6, 2016.

FIELD OF THE INVENTION

Embodiments of the invention generally relate to data processing systems. Specifically, embodiments of the invention relate to systems where data items are intelligently grouped outside of typical Operating System and document data management system collections and groupings.

BACKGROUND OF THE INVENTION

Data processing systems, computers, networks of computers, or the like, offer users and programs various ways to organize and manage data via the operating system ("OS"). Data consists of a stored sequence of bits. A data object may include but is not limited to the contents of a file, a portion of a file, a data record, a page in memory, an object in an object-oriented program, a digital message or any other digital representation of information.

An OS on a computer generally provides a file system in which data items are organized and stored as files on a suitable storage medium. Files can be grouped into collections of files, known as directories, which can then be grouped into other directories. Users and programs must navigate through a hierarchical path of directories in order to find a particular data object (file). The OS provides for interaction with the file system via a "shell" or operating environment ("OE") which can be controlled through a command line or its equivalent graphical use interface.

In a database management system, data is organized as records in tables. These tables can be grouped into database files. Users and programs must query the database tables to find a particular data item (record) using a dedicated database application.

A data item generally has a distinct location in memory or disk. Most personal computer OS's organize their data in file systems where a user can navigate the system through directories and sub directories so that a file has a unique location and pathname in the file system. Copies of files in different directories are separate files distinct from each other. Users can create shortcuts or aliases to a particular file, which create a pointer to a file permitting access to the original file from multiple locations in the file system. However, such shortcuts or aliases are merely links containing the address of a file which are broken if the original file is moved or deleted. Additionally, shortcuts to do not provide a What-You-See-Is-What-You-Get ("WYSIWYG") preview of the data, or access to the file metadata, in the same way that that the actual file does.

Such systems are generally limited by their data management structures. It may be desirable to organize and manage data outside of the normal data structures, such as database and file system structures, and combine them in a standalone unified data management and visualization system.

SUMMARY

Method and apparatus for shallow copy functionality are provided. The invention discloses embodiments capable of creating, managing and editing a user's data and a graphical, and related command line, user interface for visualizing and interacting with both the containers for collections of data items and the contained data items. The invention provides importing data from a computer data storage into one or more preprogrammed container hierarchies organized by containers and sub-containers, assigning a unique identifier to each imported data object. Adding copies of a source data object to one or more selected containers, each container having a member listing, is complete by adding the identifier to the member listing of the selected containers. Further, opening and allowing editing of the source data objects, while simultaneously blocking edit access to copies of the data object having the same identifier, based upon edits of any copy of said data object occurs. Lastly, saving the source data object while releasing the block on copies of the data object having the same identifier, based upon completion of editing and saving of any copy of said data object takes place.

BRIEF DESCRIPTION OF THE DRAWINGS

The accompanying drawings taken in conjunction with the detailed description will assist in making the advantages and aspects of the disclosure more apparent.

DETAILED DESCRIPTION

Figure 1:
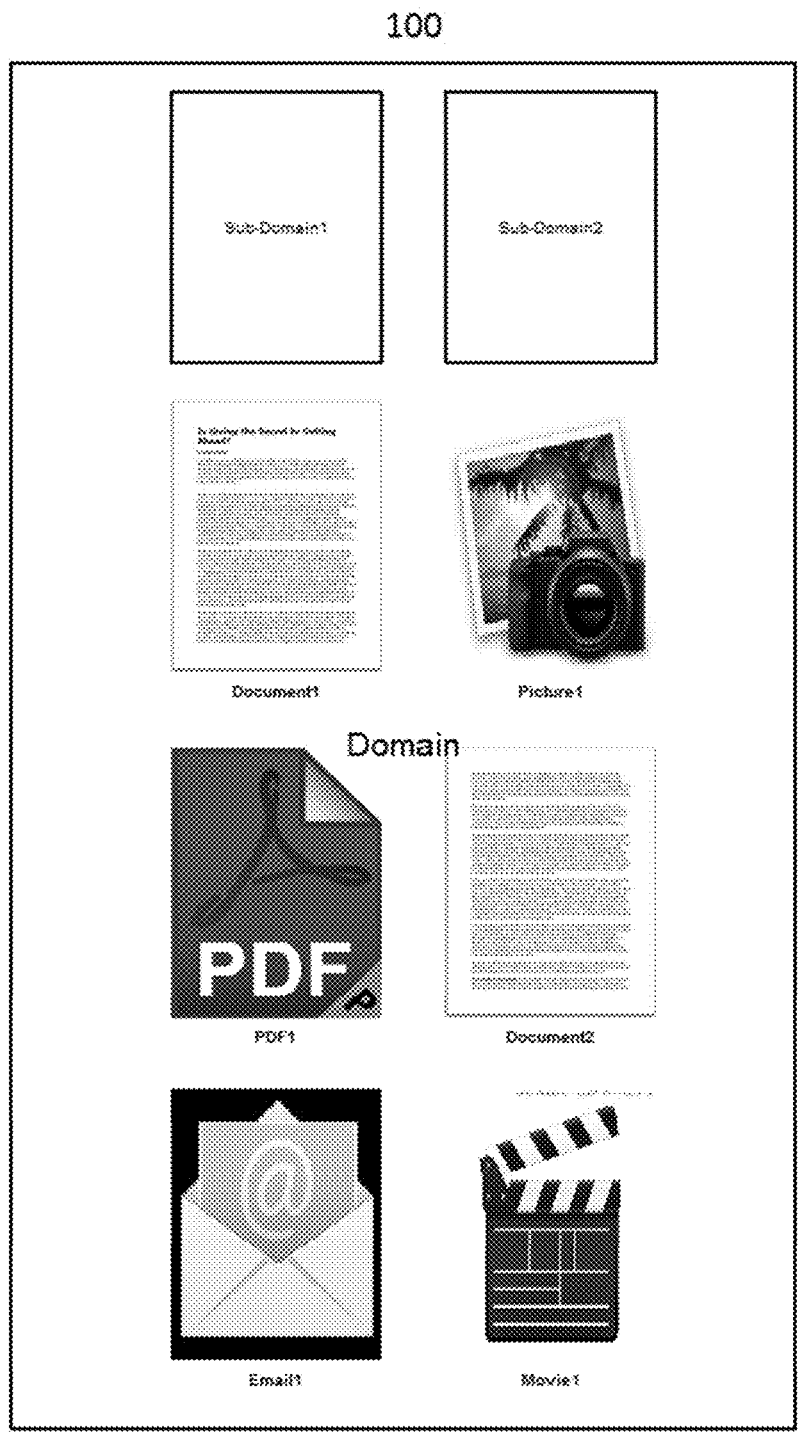
FIG. 1 is a diagram of a container/domain and its contents.

Reference will now be made in detail to the present embodiments discussed herein, illustrated in the accompanying drawings. The embodiments are described below to explain the disclosed method and apparatus by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate.

The subject matter is presented in the general context of system and program modules that are able to read and write data to memory, physical storage, databases, or similar. Those skilled in the art will recognize that other implementations may be performed in combination with other types of data structures, components, or routines that perform similar tasks. The invention can be practiced using various computer system configurations, such as client server systems. Other usable systems can include, but are not limited to, mainframe computers, microprocessors, personal computers, smart phones, tablets, and other consumer electronic devices. Such computer devices may include one or more processors, data storage in the form of memory (hard disk, random access memory, cache memory, etc.) or a database, and an OS.

Method and apparatus for shallow copy functionality are provided. The invention discloses embodiments capable of creating, managing and editing a user's data (data management) and a graphical, and related command line, user interface for visualizing and interacting with both the containers for collections of data items and the contained data items (its operating environment).

Data management systems have been developed with means to form groups of data items. For example, in a typical file system, users and programs can create collections of items in a file system by placing data files in directories and subdirectories. The user generally has control over how data is organized, but is still limited by the file system hierarchical structure.

Current data management systems and especially operating systems are restricted in the flexibility of their file management. The same data file cannot simultaneously be located in multiple folders such that the user sees an identical version of the file in each folder location and that editing any copy of the file edits and updates all the identical copies in all locations. This invention provides for "shallow copies" where by a data file exists in multiple container locations in the system and that editing one the file in any location updates all identical copies in all locations.

The present invention provides a mechanism for more efficiently and intelligently organizing data into enhanced folders, hereinafter called domains. Domains subsume all of the traditional functionality of OS folders, such as copy, pasting and moving files, along with the presently described shallow copying.

This functionality is accomplished by a system configured with a stand-alone data management and visual application ("DMVA"). Such DMVA can be loaded onto a computer, server or device, intermediating between the host operating system and its data and any other external data to which the user has access or possession. The DMVA provides domains into which the user may import data from available sources. Once data resides in the DMVA domain hierarchy the user is empowered to group files in domains according to preference. Where appropriate the user can deposit the same file through shallow copies in multiple domains, according to his various filing rationales. Shallow copying is also enabled for complete domain hierarchies inside the DMVA and their contained data files.

In such a system, every object exists in a domain, with the topmost container being the user's system itself. A domain object has various attributes such as name, last accessed and created dates, as well as other metadata. Every data item or domain has a unique identifier or ID ("UID"). Additionally, each domain contains a list, array or collection of objects that identifies the child objects of the domain which may be a data object or another domain. Every domain or data file maintains a list of the domain locations where it is filed. Domains and their contained domains and data are persistent and the created hierarchy of them is presented identically across all of the user's provisioned devices and computers.

A system cannot be contained by another system, although multiple systems can establish shared domains between them. A domain cannot be contained by itself, either directly, or indirectly in another container nested within it. No two domains residing in the same domain may share a name or UID. No two data objects residing in the same domain location may share a name or UM. Shallow copies—domain or data file—share a UID. Therefore, no two shallow copies can exist in the same domain.

As illustrated in FIG. 1, a domain 100 is a container for a collection of data. The contents of a domain may be heterogeneous as to data format and storage type. A single domain may contain various forms of data such as documents (text files, PDFs, etc.), pictures, multimedia (audio, video, movie, etc.), emails, and database records (provided, of course, such emails or database records can be ingested into the DMVA as independent documents). Additionally, domains can contain other domains, referred to as child domains or sub-domains. In this way, domains are similar to folders/directories in a file system. The DMVA's user interface can mimic the appearance and functionality of data files and folders in a file system, where a user can browse through domains and sub-domains to view data.

For example, a user may want to group together all data relevant to his/her car. This could include the car purchase invoice, car maintenance record, email communications about the car, and photographs of the car. The user can create a domain, select all of the relevant data items, and add them to the domain.

Figure 2:
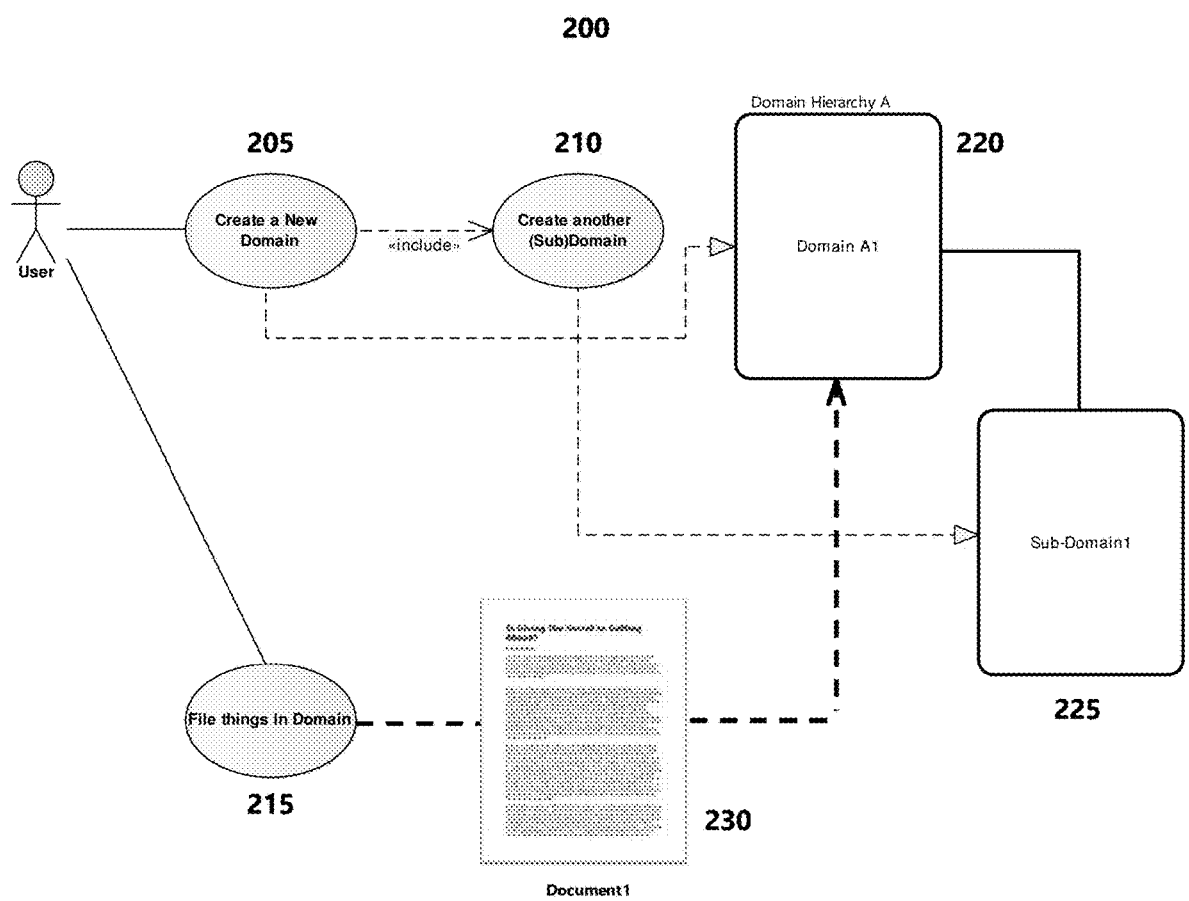
FIG. 2 is a flowchart of how a user might set up an intelligent container/domain system.

As illustrated in FIG. 2, a flowchart 200 of how a user can set up domains and add domain member items in a domain system implementation is provided.

The user interacts with the DMVA by loading its executable program on a computer, or on other devices through the medium of a web browser or thin client. A general user interface allows a user to create 205 a new domain, Domain A1 220. The domain object contains various familiar attributes such as name, last edited and created dates, and origin (whether system or user defined) as well as other metadata. The child objects in the domain—its content, are stored in an array or other collection structure which can be made persistent on physical storage, where each item stored is referenced by its UID internally and by its name for presentation to the user.

A user can add or create 210 other domains as child or sub domains, Sub-domain 1 225. The user can search for other domains in the system using a general user interface or alternatively, the user can create a sub-domain in the same manner that the original domain 220 was created. The user then adds the new domain as a sub-domain 225 in the domain hierarchy 220. An "add sub-domain" or similar function can be called which adds the sub-domain to the list of child domains and sets other appropriate attributes. This process is easily repeated to create a domain system with various domain system hierarchies The user can search for data in the system and add 215 the data to a domain. A general user interface allows users to search or browse for data items, Document 1 230, in the system. The user then adds the data item 230 as a member of the domain 220. An "add data member" (or similar) function can be called which adds the data item to the list of child objects of the domain and sets other appropriate attributes. The domain can be added to the list of domains that the data item is a member of using a domain member object function. This process is easily repeated to create to add data items to the domain system and place the data in multiple domain system hierarchies.

Figure 3:
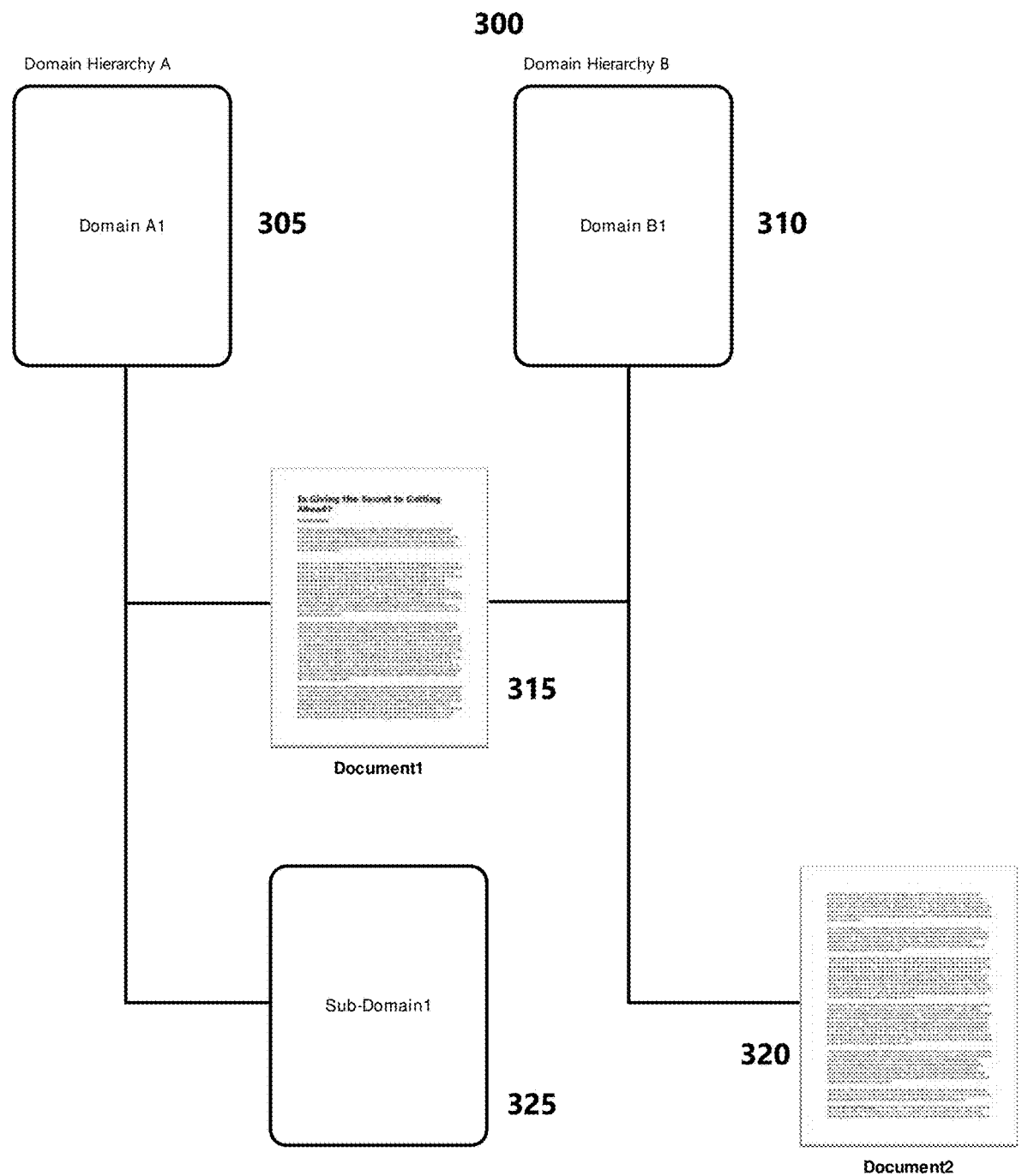
FIG. 3 is a diagram of two containers/domains and their content data as a tree diagram.

As illustrated in FIG. 2 and FIG. 3, a tree diagram 300 and a Venn diagram 400 of a domain system are provided. Domains are not constrained by the same rigid structures of a file system. A file system has a hierarchical tree structure. Domains can, but are not required to, have hierarchical tree relationships. As depicted, Domain Hierarchy A contains Domain A1 305,405 and a data item Document 1 315,415 and sub domain 325,425. Domain Hierarchy B contains Domain B1 310,410 and Document 1 315,415 and Document 2 320,420. A user is not restricted to organizing a data item in a single data path or file path. In the Venn diagram and tree structure visualizations Document 1 315,415 is a member of both Domain A1 305,405 and Domain B1 310,410. Document 2 320,420 is only a member of Domain B1 310,410. The sub domain 325,425 is only a part of Domain A1's 305,405 hierarchical tree structure. As users see data items as relevant to various aspects of their lives, shallow copies allow data items to be members of various domains and domain hierarchies in a domain system.

For example, a user may want to group together all data relevant to his/her car (Domain A). A user additionally may want to group together all data relevant to one of his email/phone contacts (Domain B), including but not limited to email conversations. When the user sends emails with a document (Document 1) that relates to his car as an attachment to the contact, the user may want the document to be grouped as a data item member of Domain A and Domain B.

A data item generally has a distinct location in memory or on disk. A file has a unique location and pathname in the file system. Copies of files in different directories are separate files distinct from each other. In contrast, domains allow a user to shallow the same file into multiple domains. From each domain, a user can open and edit the file. Changes made to one shallow copy are made to each of the other shallow copies. During editing the other copies are locked against editing and may only be viewed.

When a file is copied in a normal operating system, the original and its copy become two separate entities. Following the creation of the copy, editing one file leaves the other unaffected. If the user wishes to have a file exist in another folder, a shortcut or alias must be created.

Limitations exist to the ability to preview the underlying file via the shortcut. An alias does display a WYSIWYG preview in some circumstances; however a shortcut in Windows does not. On a shortcut or alias, the properties shown for the file are those of the shortcut or alias, not of the original base file. Opening a folder shortcut or alias, opens the base file in its original folder location.

Figure 4:
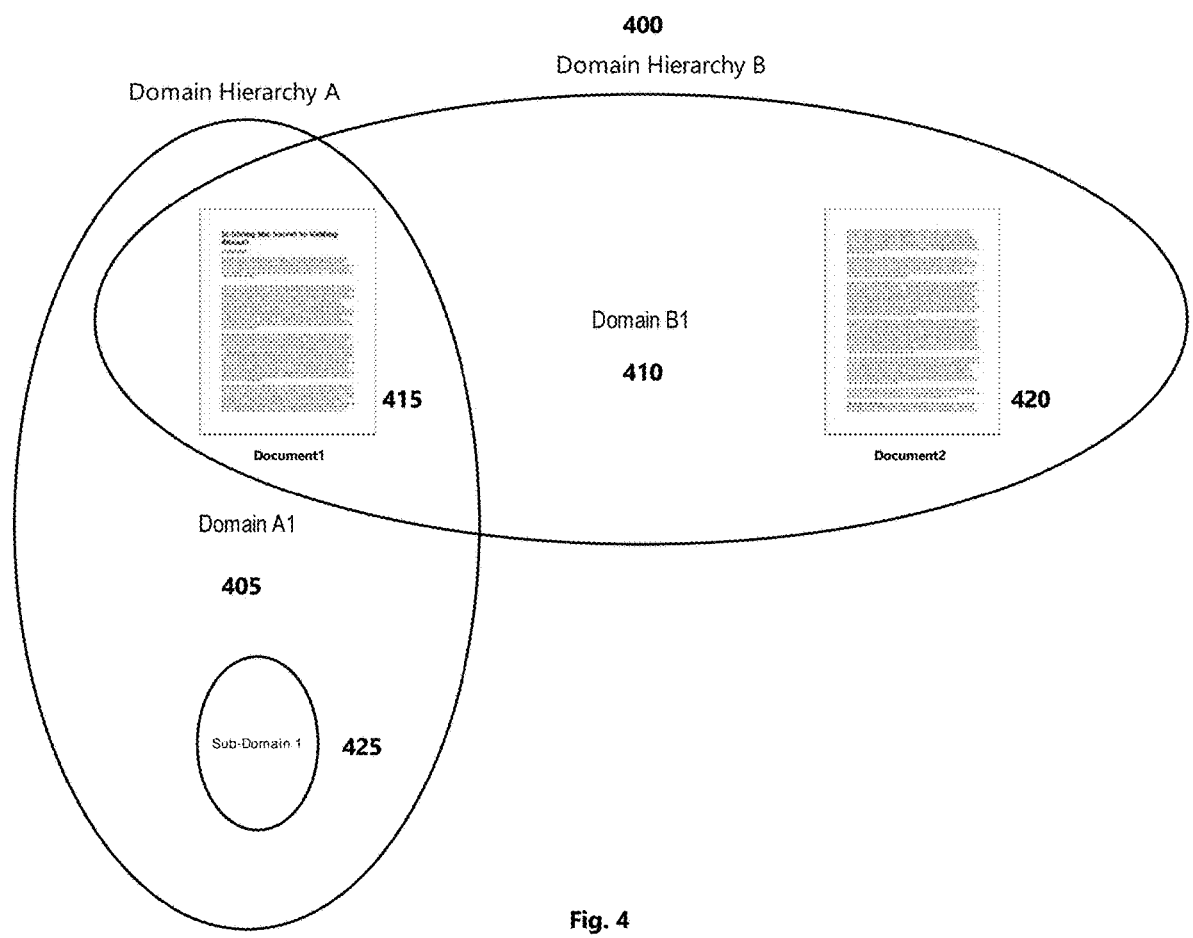
FIG. 4 is a diagram of two containers/domains and their content data as a venn diagram.

In a domain system, shallow copies create an object where the shallow copied object's properties, behavior and appearance are those of the original. Shallow copies allow the user to file an object in as many unique locations/domains as the user desires, as illustrated in FIG. 3 and FIG. 4. The user does not need to know where the original file is located. Editing any one of the copies edits all of the others.

Within a domain system, the user can choose to make either a shallow copy or a separate "deep" copy of an object. A deep copy is a traditional copy, where the new copy is entirely independent of the original and has a new UID: editing it does not affect the original in any way. When a shallow copy is made, the copy is linked to the original for editing purposes. Changing the content of one domain shallow copy updates the content of all the other shallow copies of that domain, local or shared. All of these shallow copies are independently manipulable and indistinguishable from one another, containing identical copies of the original source of the domains, data objects, metadata, manipulation history, etc. Editing of one data file instance locks all of the other instances, local or shared, from simultaneous editing. Upon saving, the data in all the other instances is updated. Shallow copies are unaffected by a change in location of the underlying source file. When a domain is copied, shallow copies are created of all content domains and data objects.

In embodiments utilizing a database, a table can be used to identify member records. Rows for each member record with a key identifying the domain name can be queried and retrieved into a user interface similar to a directory view. Queries can be performed to retrieve necessary identifying information to access the source data.

In other embodiments, this can be done using a file that identifies the file path of each member file. Such a file can be a text file that identifies the member file pathnames. The pathnames can be parsed so that the file can be opened in a user interface similar to a directory view and one known to those skilled in the art.

As data objects are added to domains, references are created to data objects in memory and disk locations throughout the system. The data item can be opened and edited using well known file editing applications from within the domain.

Domain functions that delete data object members and child domains from a domain remove only the reference. The data item or sub domain is removed from the domain, but other copies remain unaffected.

Figure 5:
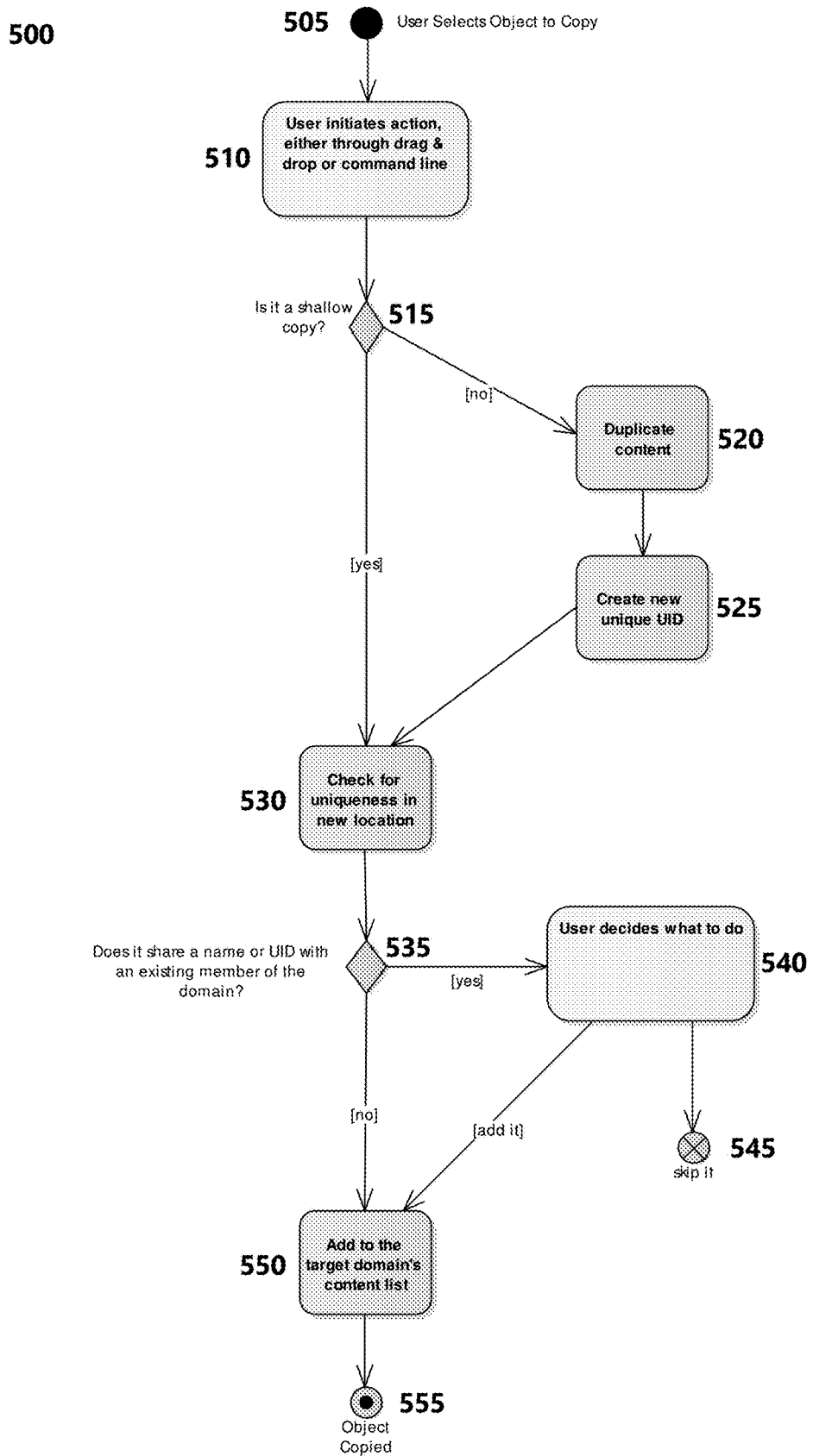
FIG. 5 is a flowchart of the process of copying objects in an intelligent container/domain system.

As illustrated in FIG. 5, a flowchart 500 of showing the process of copying objects is provided.

Data management systems allow users to copy objects into containers. Generally a user selects 505 the object to copy and initiates 510 the copy via drag and drop, command line or similar. In a domains system, the user can choose 515 to make a traditional copy or a shallow copy. A traditional "deep" copy, duplicates 520 the object and its content, actually copying the physical data to an additional place in physical memory with a new memory address. The DMVA assigns the newly created object a new UID 525. For both shallow and deep copy functionality, objects must be checked for uniquenesss in the destination domain 530. The system checks if the objects shares a name and UID with an existing member of the domain 535. If the object exists in the destination domain, the user can choose take appropriate steps 540, such as skip the copy 545 or rename the copy. If the copy proceeds, the data item is added to the list of child objects of the domain 550, which can be done by calling an "add data member" (or similar) function. The object is copied 555 resulting in the appearance of the data object in the destination domain.

A traditional deep copy necessarily duplicates the object and its content. Depending on the persistence strategy implemented for a shallow copy, the object and its contents are not necessarily duplicated. The object is identically visualized in the destination domain, but references back to the original data object. Alternatively the object may be physically copied into the other domain locations, and the system monitors for editing of one, at which point the other copies are locked. Subsequent to completing of editing the other copies are updated.

Figure 6:
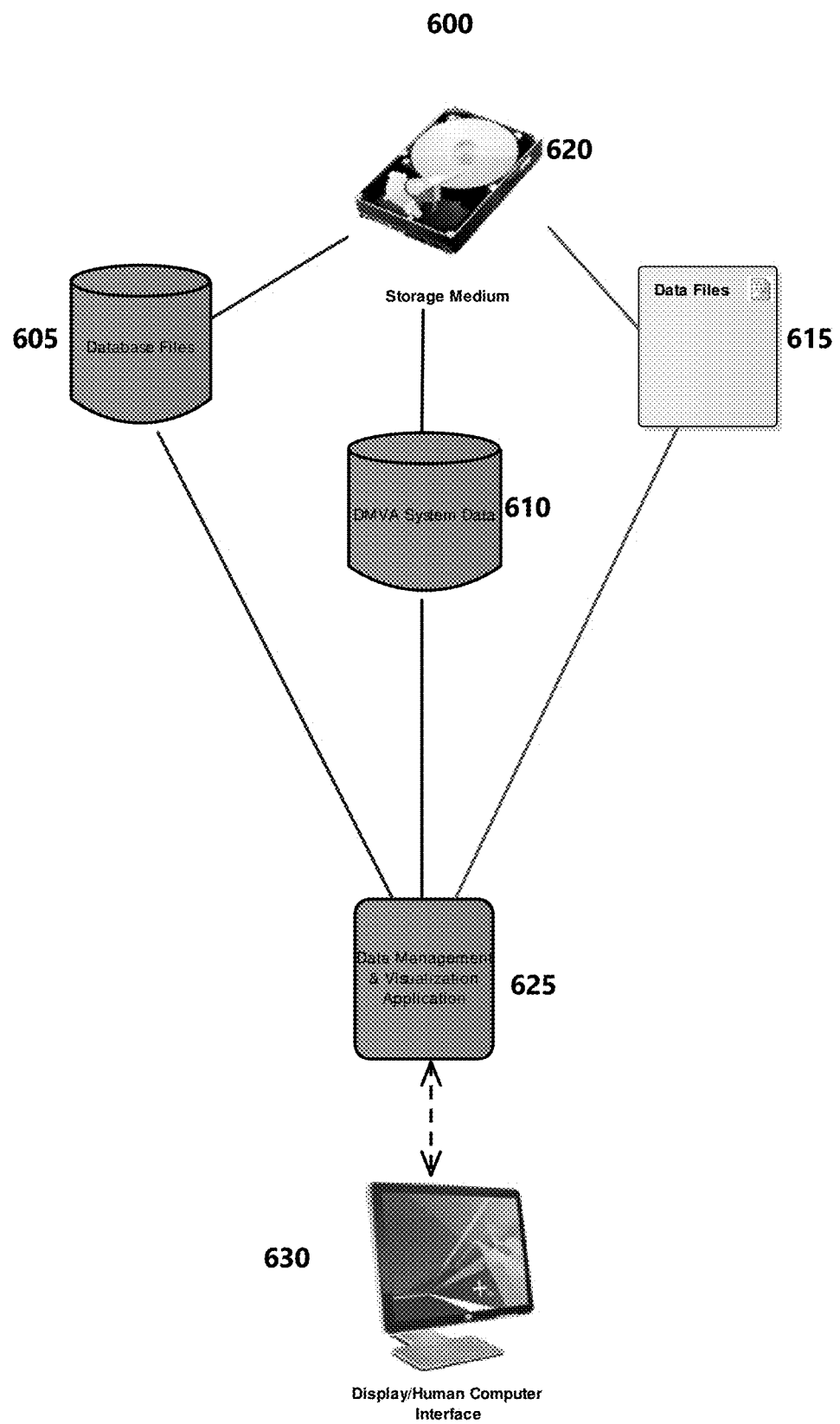
FIG. 6 is a block diagram of a general system embodiment on a single computer.

As illustrated in FIG. 6, a block diagram 600 of a general system embodiment on a single computer device is provided.

In a general system embodiment, a single computer device is configured to perform all elements of the invention. Some components of the computer include one or more processing units, storage medium 620 (hard disk, random access memory, cache memory, etc.), an OS, and an electronic visual display 630. Data can be organized as data files 615 and/or as database files 605. DMVA 625 installed on the system is able to access the data files 615, database records 605. The data managing application creates, manages and visualizes the data as domains and member data objects and stores this DMVA data 610 in a database or some other data structure. The DMVA 610 can include domain objects, pointers, and other attribute data.

Figure 7:
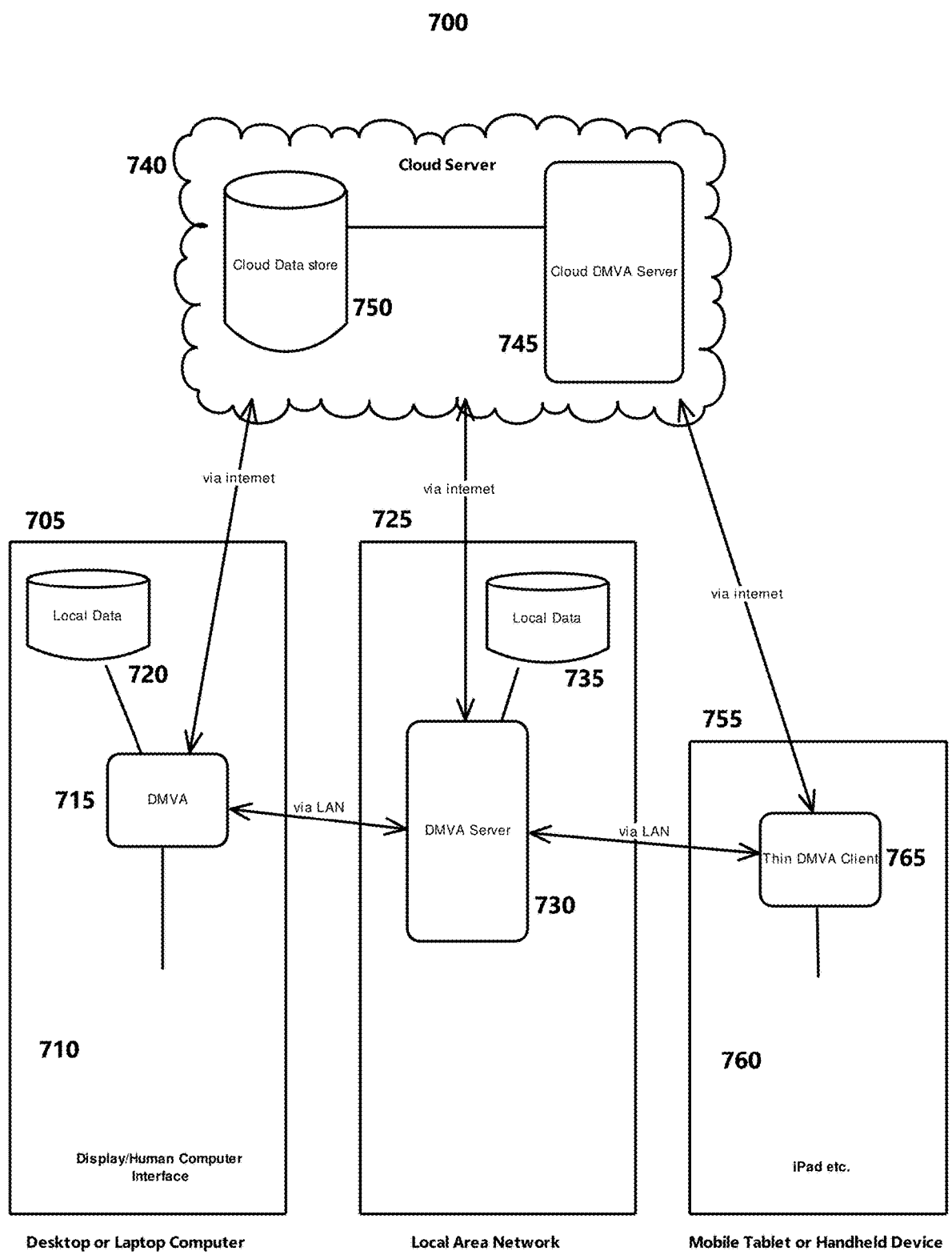
FIG. 7 is a block diagram of a general system embodiment on multiple computers.

As illustrated in FIG. 7, a block diagram 700 of a general system embodiment on multiple computer devices is provided.

In other embodiments, the invention is performed over multiple computer devices in a client server configuration. As depicted, the user can interact with the system via a computer device 705. Some components of the computer include one or more processing units, storage medium (hard disk, random access memory, cache memory, etc.), an OS, and an electronic visual display 710. The computer device can be configured to run the DMVA 715 to create, manage and visualize the data as domains and member data objects. The data can be located directly on the computer device (local data 720 which can include 605, 610, 615) or can be accessed on a local area network server 725 or a cloud server 740 via the internet. The local area network server device 725 is configured with a DMVA server application 730 allowing for access to its own local data 735, as well as communication with the cloud server 740. The cloud server 740 is configured with a DMVA server application 745 allowing for access to it's the cloud date store 750, as well as communication with the client device 705 and local area network server 725 via the internet. The data managing application 715 is able to manage and synchronize local data 720 along with server data 735, 750. Further, a mobile device client 755, also with a visual display 760, can be configured with a thin DMVA 765 that can only access data on local area network server 725 or a cloud server 740. It should be appreciated that other computer system configurations can be used.

The preceding description is of various embodiments and no limitation of the scope is thereby intended.

That which is claimed is:

1. A computer-implemented method for shallow copying a data object comprising:
    importing data from a computer data storage into one or more preprogrammed container hierarchies organized by containers and sub-containers;
    assigning a unique identifier to each imported data object;
    adding copies of a data object to one or more selected containers, each container having a member listing, by:
        a) adding the identifier to the member listing of the selected containers;
        b) storing each copy of the data object as a distinct and persistent data object on the computer data storage;
    locking all other copies of the data object having the same identifier, based upon edits of any copy of said data object, thereby preventing simultaneous editing;
    synchronizing content of all copies of the data object having the same identifier, based upon completion of editing and saving any copy of said data object.

2. The method of claim 1, wherein if a copy of the data object is already a member of a container, the identifier is not added to the member listing of the container.

3. The method of claim 1, wherein if a copy of the data object is already a member of a container, the copy of the data object is renamed and a new identifier is generated and added to the listing of the container's member.

4. The method of claim 1, wherein the member listing of each container is stored in a database.

5. A computer-implemented method for shallow copying a data object comprising:
    importing data from a computer data storage into one or more preprogrammed container hierarchies organized by containers and sub-containers;
    assigning a unique identifier to each imported data object;
    adding copies of a source data object to one or more selected containers, each container having a member listing, by:
        a) adding the identifier to the member listing of the selected containers;
    opening and allowing editing of the source data objects, while simultaneously blocking edit access to copies of the data object having the same identifier, based upon edits of any copy of said data object;
    saving the source data object while releasing the block on copies of the data object having the same identifier, based upon completion of editing and saving of any copy of said data object.

6. The method of claim 5, wherein if a copy of the data object is already a member of a container, the identifier is not added to the member listing of the container.

7. The method of claim 5, wherein if a copy of the data object is already a member of a container, the copy of the data object is renamed and a new identifier is generated and added to the listing of the container's member.

8. The method of claim 5, wherein the member listing of each container is stored in a database.

9. An apparatus comprising at least one processor and at least one memory having data organized by containers and sub-containers in a container hierarchy, each data object having a unique identifier, and including computer program code the at least one memory and the computer program code configured to, with the at least one processor, cause the apparatus at least to:
    adding copies of a source data object to one or more selected containers, each container having a member listing, by:
        a) adding the identifier to the member listing of the selected containers;
    opening and allowing editing of the source data objects, while simultaneously blocking edit access to copies of the data object having the same identifier, based upon edits of any copy of said data object;
    saving the source data object while releasing the block on copies of the data object having the same identifier, based upon completion of editing and saving of any copy of said data object.

10. The apparatus of claim 9, wherein if a copy of the data object is already a member of a container, the identifier is not added to the member listing of the container.

11. The apparatus of claim 9, wherein if a copy of the data object is already a member of a container, the copy of the data object is renamed and a new identifier is generated and added to the listing of the container's member.

12. The apparatus of claim 9, wherein the member listing of each container is stored in a database.

* * * * *